United States Patent
Kosonen et al.

(10) Patent No.: US 9,744,635 B2
(45) Date of Patent: Aug. 29, 2017

(54) MACHINE FOR REPLACING DISC TOOLS

(71) Applicant: JOT Automation Oy, Kempele (FI)

(72) Inventors: Petri Kosonen, Lohja (FI); Tarmo Linna, Helsinki (FI); Toomas Tiismaa, Harjumaa (EE); Pertti Sipila, Oulu (FI); Hannu Lempea, Helsinki (FI); Kimmo Arovirta, Vantaa (FI); Vesa Hirvonen, Espoo (FI)

(73) Assignee: JOT AUTOMATION OY, Kempele (FI)

( * ) Notice: Subject to any disclaimer, the term of this patent is extended or adjusted under 35 U.S.C. 154(b) by 680 days.

(21) Appl. No.: 14/164,759

(22) Filed: Jan. 27, 2014

(65) Prior Publication Data

US 2014/0243176 A1  Aug. 28, 2014

(30) Foreign Application Priority Data

Jan. 28, 2013  (EP) ..................... 13152843

(51) Int. Cl.
*B23Q 3/157* (2006.01)
*B24B 45/00* (2006.01)
(Continued)

(52) U.S. Cl.
CPC ......... *B23Q 3/15713* (2013.01); *B23D 61/00* (2013.01); *B23Q 3/1554* (2013.01); *B23Q 3/15513* (2013.01); *B23Q 3/15526* (2013.01); *B24B 45/003* (2013.01); *B24D 9/085* (2013.01); *B23Q 3/15536* (2016.11); *B23Q 2003/155407* (2016.11); *B23Q 2003/155411* (2016.11);
(Continued)

(58) Field of Classification Search
CPC .................................. Y10T 483/174

USPC .......................................... 483/33
See application file for complete search history.

(56) References Cited

U.S. PATENT DOCUMENTS 4,780,951 A * 11/1988 Beyer .................. B23Q 3/1554
451/342
6,030,326 A * 2/2000 Azuma ..................... B27B 5/30
483/30

FOREIGN PATENT DOCUMENTS

DE  3246168 A1  7/1983
DE  3326292 C1  1/1985
(Continued)

OTHER PUBLICATIONS

Machine Translation JP 07-017443-U, which JP '443 was published Mar. 1995.*

(Continued)

*Primary Examiner* — Erica E Cadugan
(74) *Attorney, Agent, or Firm* — Hoffmann & Baron, LLP

(57) ABSTRACT

A method and a machine for automatically changing a disc tool to a tool holder of an automated machine working with the disc tools is disclosed. The method includes in the disc tool replacement machine: determining that the tool holder is in a replacement area in the disc tool replacement machine; unfastening a fixing member of the tool holder by applying an unfastening force to the fixing member, wherein the fixing member fixes a disc tool to a backing plate of the tool holder through a through hole at a centre of the disc tool; removing the disc tool from the tool holder after said unfastening; inserting a new disc tool to the tool holder; and fastening the fixing member of the tool holder by applying a fastening force to the fixing member, thus fixing the disc tool to the backing plate of the tool holder through the through hole.

22 Claims, 5 Drawing Sheets

(51) Int. Cl.
*B24D 9/08*       (2006.01)
*B23D 61/00*      (2006.01)
*B23D 61/02*      (2006.01)
*B23Q 3/155*      (2006.01)

(52) U.S. Cl.
CPC .......... *Y10T 483/10* (2015.01); *Y10T 483/136* (2015.01); *Y10T 483/174* (2015.01); *Y10T 483/1736* (2015.01)

(56) References Cited

FOREIGN PATENT DOCUMENTS

| | | |
|---|---|---|
| DE | 3620047 A1 | 1/1987 |
| DE | 10 2007 004 633 A1 | 8/2007 |
| EP | 2 067 570 A1 | 6/2009 |
| FR | 2 823 142 A1 | 10/2002 |
| JP | 07-017443 U * | 3/1995 |
| JP | 2007-229843 A * | 9/2007 |

OTHER PUBLICATIONS

Machine Translation of JP 2007-229843, which JP '843 was published Sep. 2007.*
European Office Action, EP 13 152 843.2, dated Sep. 16, 2015, 5 pages.
European Search Report, Application No. EP 13 15 2843, Apr. 30, 2013.

\* cited by examiner

MACHINE FOR REPLACING DISC TOOLS

CROSS-REFERENCE TO RELATED APPLICATION

This application claims priority to European Application No. 13152843.2, filed Jan. 28, 2013, which is incorporated by reference herein in its entirety.

BACKGROUND

Field

The invention relates to the field of automation and, particularly to a machine for replacing disc tools.

Description of the Related Art

Disc tools such as grinding discs lose their grinding surface rapidly in automated applications, e.g. when the grinding discs are used by an automated robot or another automated machine capable of using various disc tools. Automated solutions in replacing the disc tools are needed to improve efficiency.

SUMMARY

According to an aspect of the invention, there is provided a method comprising in a disc tool replacement machine: determining that a tool holder of an automated machine working with disc tools is in a replacement area in the disc tool replacement machine; unfastening a fixing member of the tool holder by applying an unfastening force to the fixing member, wherein the fixing member fixes a disc tool to a backing plate of the tool holder through a through hole at a centre of the disc tool; removing the disc tool from the tool holder after said unfastening; inserting a new disc tool to the tool holder; fastening the fixing member of the tool holder by applying a fastening force to the fixing member, thus fixing the disc tool to the backing plate of the tool holder through the through hole.

According to another aspect of the invention, there is provided a disc tool replacement machine comprising: a controller configured to determine that a tool holder of an automated machine working with disc tools is in a replacement area in the disc tool replacement machine; a fastening tool configured to unfasten a fixing member of the tool holder by applying an unfastening force to the fixing member, wherein the fixing member fixes a disc tool to a backing plate of the tool holder through a through hole at a centre of the disc tool; a replacement system configured to remove the disc tool from the tool holder after said unfastening and insert a new disc tool to the tool holder, wherein the fastening tool is further configured to fasten, after the new disc tool has been inserted to the tool holder, the fixing member of the tool holder by applying a fastening force to the fixing member, thus fixing the disc tool to the backing plate of the tool holder through the through hole.

According to yet another aspect of the invention, there is provided a computer program product embodied on a non-transitory distribution medium readable by a computer and comprising program instructions which, when loaded into the computer, cause the computer to execute a computer process comprising: determining that a tool holder of an automated machine working with disc tools is in a replacement area in a disc tool replacement machine; causing unfastening of a fixing member of the tool holder by causing application of an unfastening force to the fixing member, wherein the fixing member fixes a disc tool to a backing plate of the tool holder through a through hole at a centre of the disc tool; causing removal of the disc tool from the tool holder after said unfastening; causing insertion of a new disc tool to the tool holder; causing fastening of the fixing member of the tool holder by causing application of a fastening force to the fixing member, thus fixing the disc tool to the backing plate of the tool holder through the through hole.

Embodiments are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
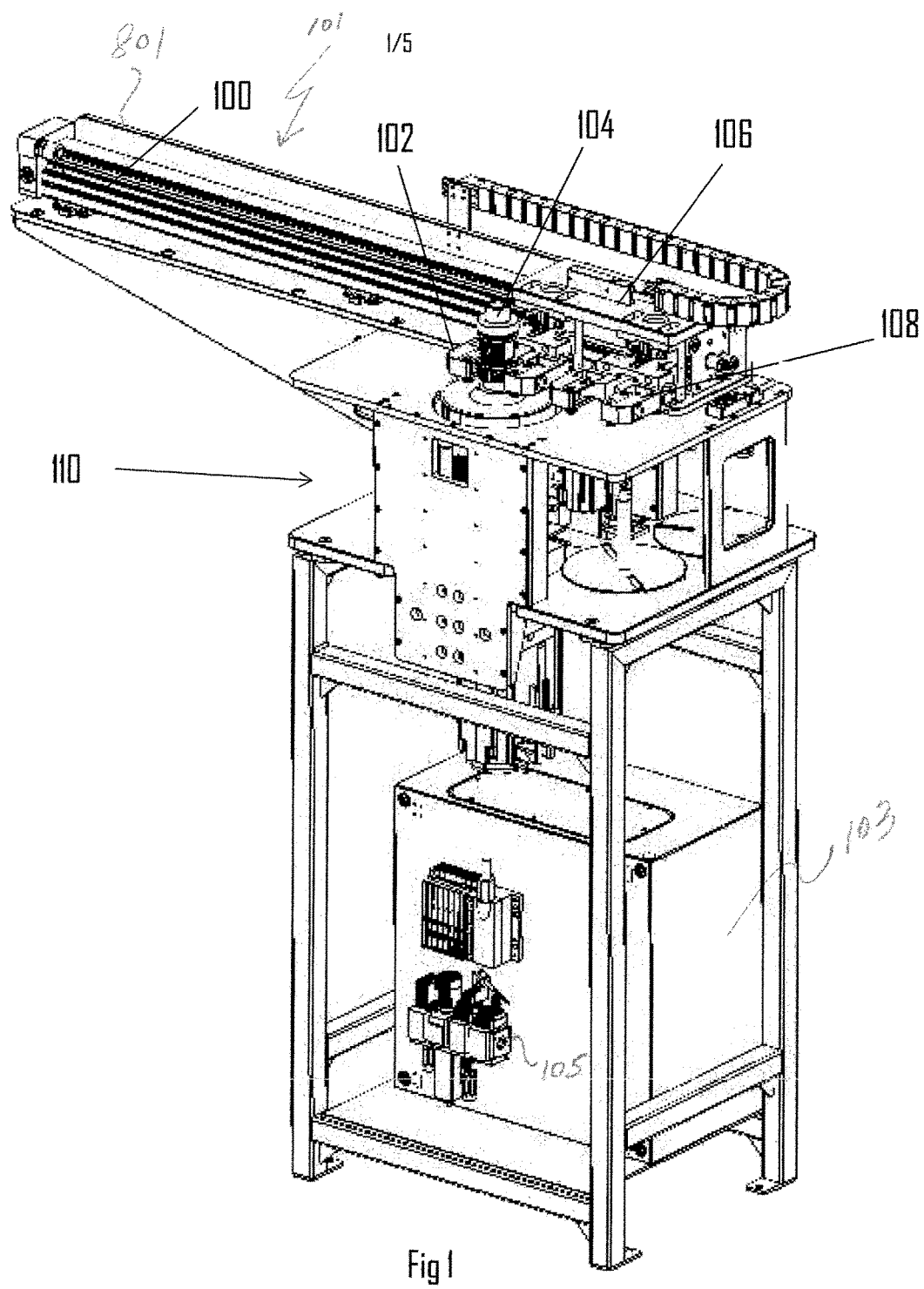
FIG. 1 illustrates a disc tool replacement machine according to an embodiment of the invention.

FIG. 1 illustrates an embodiment of an automated disc tool replacement machine arranged to replace a disc tool attached to a tool holder 104. The tool holder 104 may be understood to serve as an adapter connecting the disc tool to a robot arm and mediating a rotary force provided by a motor comprised in the robot, e.g. a gear motor or a spindle motor. The tool holder may be detached from the robot arm by the robot itself when changing the disc tool, for example, but in some embodiments the tool holder may be fixed to the robot arm. The automated disc tool replacement machine may be configured to support replacement of disc tools for both types of tool holders. Although robot with an arm is used as an example in the embodiments described herein, the disc tool replacement machine is applicable for use with any automated machines that use replaceable disc tools.

Referring to FIG. 1, the disc tool replacement machine comprises at least one gripper 102, 108 configured to grip the tool holder. In the embodiment of FIG. 1, there are two grippers 102, 108. The grippers 102, 108 may be fixed to a fixture 106 arranged to move along a guiding track 100. The guiding track may extend to provide an elongated arm that may be positioned in a working area of the robot while a frame and a disc tool replacement area remain outside the working area. This enables moving the tool gripper(s) 102, 108 between the working area and the disc tool replacement area in the disc tool replacement machine. The disc tool replacement machine may comprise a servo motor arranged to move the fixture 106 comprising the grippers 102, 108 between ends of the guiding track 100 and, as a result, at least one tool holder 104 between the working area and the disc tool replacement area. In the embodiment of FIG. 1, only two tool holders are needed: one is used by the robot while the other is in the disc tool replacement, and when the robot detects that the disc tool it currently uses is wearing out, it releases a tool holder to an empty gripper and grabs the other tool holder comprising a fresh disc tool from the other gripper. Thereafter, the robot resumes the work while the fixture is moved to the disc tool replacement area to change the worn disc tool.

The frame of the disc tool replacement area may comprise multiple levels. The fixture 106 and the guiding track 100 may be provided on the topmost level and, below that, a disc tool replacement level 110 may be provided. The disc tool replacement level 110 may comprise storage areas for new disc tools and used disc tools and tool replacement machinery. The gripper(s) 102, 108 may thus grip the tool holder 104 such that the disc tool faces downwards towards the disc tool replacement level 110.

Below the disc tool replacement level 110, a compartment may be provided for a computer or controller 103 controlling the operation of the disc tool replacement machine. The computer may comprise connectors and associated communication links to control the operation of various motors in the disc tool replacement machine and to communicate with the robot, as described in greater detail below.

Figure 2:
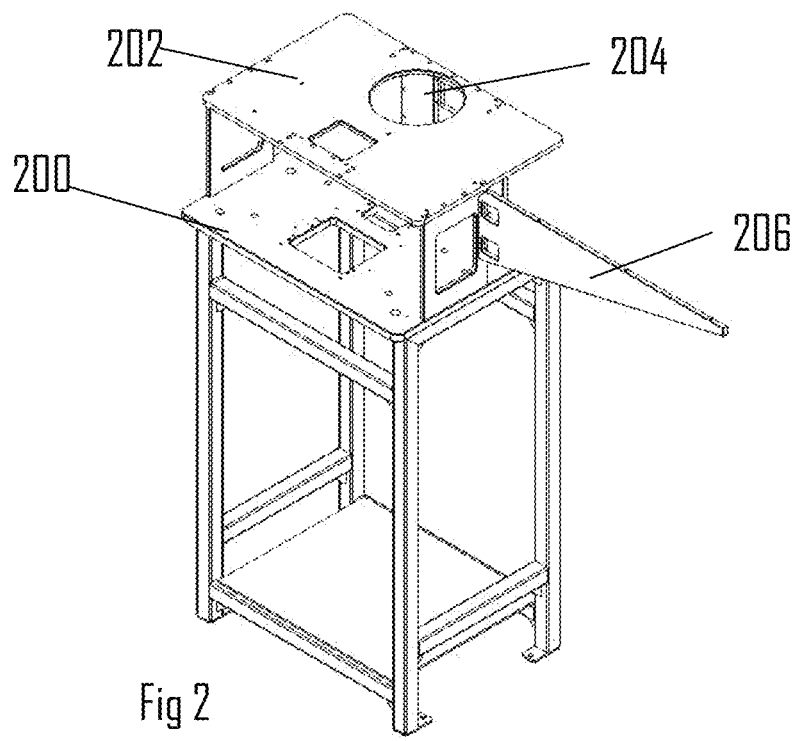
FIG. 2 illustrates a frame of the disc tool replacement machine of FIG. 1 according to an embodiment of the invention.

FIG. 2 illustrates the frame of the disc tool replacement machine. The frame may be designed into a form of a table with multiple levels or work surfaces on top of each other. The various levels may be defined by supporting plates 200, 202 provided on top of each other. The supporting plates 200, 202 may comprise through holes for installing the various machinery and for operation on the different levels. For example, a through hole 204 may be provided on the topmost supporting plate for guiding the disc tools between the topmost level where the gripper is and the disc tool replacement level 110. The frame may additionally comprise a supporting arm 206 arranged to support the guiding rail 100. The frame may be symmetric and the supporting arm may be detached and attached to either side of the frame such that the system can be made left-handed or right-handed. A base of the frame may comprise plates with through holes such that the frame may be bolted to a floor in order to ensure stability, for example.

Figure 3:
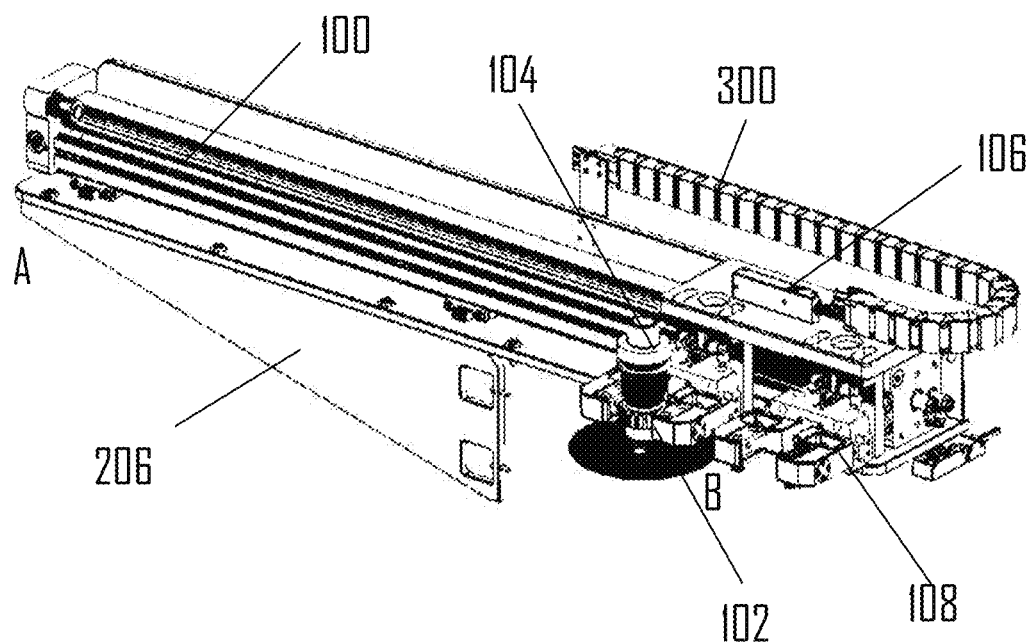
FIG. 3 illustrates a transfer unit for moving tool holders for replacement of the disc tool according to an embodiment of the invention.

FIG. 3 illustrates a transfer unit for the fixture 106 comprising the grippers 102, 108, the transfer unit is arranged to move the fixture between the ends of the guiding track 100, e.g. between the robot's work area (A) and the disc tool replacement area (B). The motion may be controlled by a servo motor (not shown) connected to the fixture 106 through a power transmission system 300 transferring the motion of the servo motor into a linear motion of the fixture 106. The operation of the servo motor is controlled by the computer controlling the disc tool replacement procedure. The servo motor is known to provide very accurate motion, which enables the computer to precisely control the positioning of the fixture 106 in the guiding track 100 by controlling the number of revolutions and/or an axle angle of the servo motor. It should be appreciated that another type of motor and power transmission system 300 for providing the fixture with a linear motion along the guiding track 100 may be used.

The computer may keep track on which one of the grippers holds the tool holder and which one does not. This may be realized by communicating with the robot and controlling the gripping mechanism of the grippers 102, 108. Upon connecting the tool holder to the robot's arm, the robot may output an instruction to the computer to release the grip from that tool holder. Similarly, when the robot brings a tool holder to the disc tool replacement machine for the replacement of a worn disc tool, the robot may position the tool holder between pincers of the gripper and instruct the computer to grip the tool holder. Thereafter, the robot may release the tool holder. Upon detecting that the robot has replaced the tool holder, the computer may determine which one of the grippers contains a tool holder having a disc tool that needs to be replaced. The computer may then determine the correct motion trajectory for the fixture such that the correct tool holder is brought to a correct position for the disc tool replacement. The correct position may be above the through hole 204 to enable the disc tool replacement from below the tool holder.

With respect to the disc tool itself, the disc tool may be a grinding disc used for grinding a surface of an object, a polishing disc used for polishing a surface, or a cutter disc used for cutting, for example. The cutter disc may have a saw-toothed edge or an abrasive edge. The disc tool may have a through hole in the middle of the disc tool for attaching the disc tool to the tool holder. Typically, the fixing may be realized via the through hole by a central nut and bolt. The tool holder may comprise a backing plate to support the disc tool and a fixing member, e.g. a centre bolt, at the centre of the backing plate for fixing the disc tool. A counterpart fixing member, e.g. a centre nut, may comprise a flange that presses the disc tool to the backing plate when the counterpart fixing member is fixed to the fixing member of the tool holder. The disc tool may comprise a base layer which may comprise a fiberglass, resin fibre, heavy paper, or metal layer. In some embodiments, the disc tool further comprises a tool layer defining the function of the disc tool. The tool layer may comprise an abrasive surface to realize the grinding or cutting function, or some soft material for the polishing. In the embodiment where the disc tool is a saw, the tool may be provided in the base layer, e.g. on the edge of the base layer.

Figure 4:
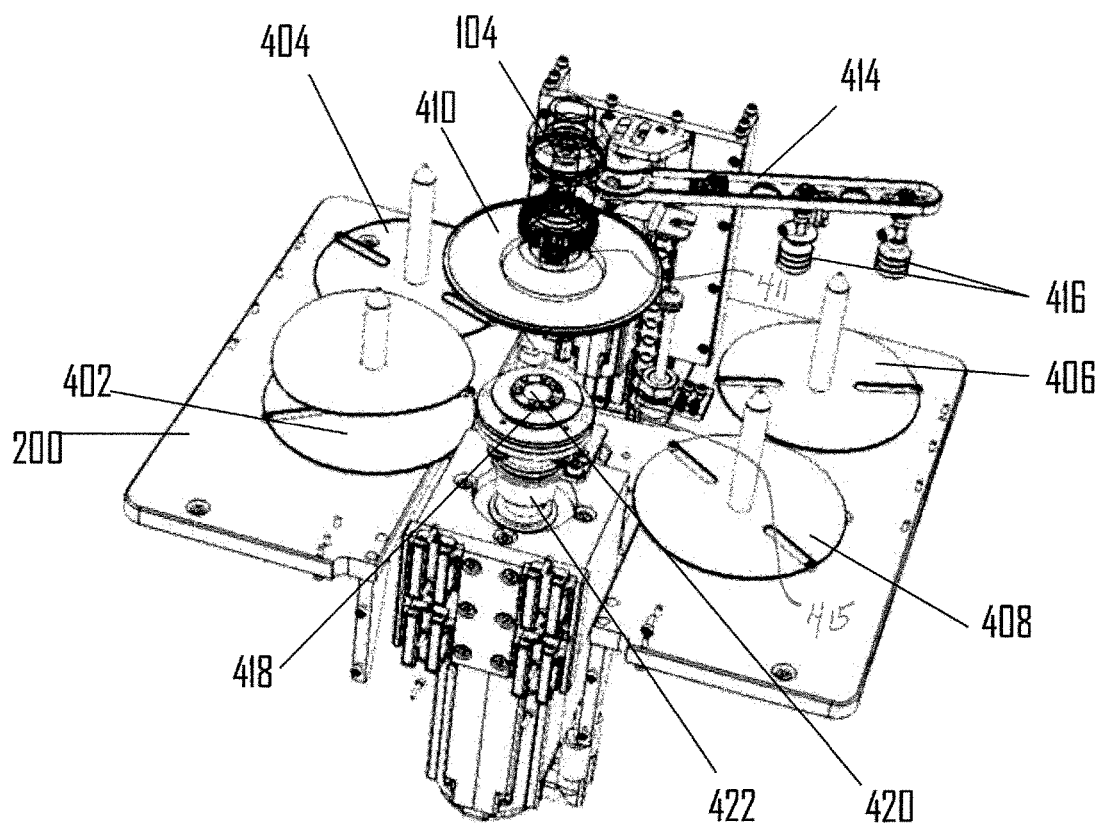
FIG. 4 illustrates components used in the replacement of the disc tool according to an embodiment of the invention.

FIG. 4 illustrates the disc tool replacement level 110 of the disc tool replacement machine. FIG. 4 illustrates also the tool holder 104 having the disc tool that is being replaced. The backing plate 410 of the tool holder is also shown. The gripper is not shown in order to simplify the illustration. A plurality of storage areas 402, 404, 406, 408 are provided on the supporting plate 200 of the disc tool replacement level 110. The storage areas 402 to 408 may comprise at least one storage area for new, unused disc tools and one storage area for used disc tools. Each storage area 402 to 408 may comprise a spindle to which the disc tools may be placed through their through holes. In an embodiment, the storage areas 402 to 408 comprise at least two storage areas for new disc tools, wherein each of these replacement areas are associated with different type of disc tool. This enables the change of different types of disc tools on a need basis, e.g. grinding disc tools with different degrees of coarseness.

A fastening/unfastening tool 422 is provided in alignment with the through hole 204 over which the tool holder 104 is placed for the replacement of the disc tool. The fastening/unfastening tool 422 may comprise a tool tip 420 matched in form to the fixing member of the tool holder such that they form counterparts for fastening and unfastening the fixing member. The fastening/unfastening tool may further comprise a flange 418 around the tool tip to provide a supporting plane for the disc tool when the fixing member is unfastened and the disc tool is detached from the tool holder. The fastening/unfastening tool 422 may comprise a motor providing a rotary motion that rotates the tool tip 420 and, as a consequence, unscrews the fixing tool from the tool holder 104 when removing the used disc tool and again screws the fixing tool to the tool holder when a new disc tool has been positioned on the flange and the fixing member has been brought into contact with the tool holder. The motor may be an electric motor, a pneumatic motor, or a hydraulic motor.

In order to move the tool tip and the disc tool detached from the tool holder with respect to the tool holder, the fastening/unfastening tool may comprise a second motor that provides the tool tip with linear motion. The linear motion may comprise linear up/down motion, but equally one could envisage embodiments where the linear motion comprises lateral motion along the supporting plate 200. The second motor may comprise a linear actuator realized by an electric motor, pneumatic motor, or a hydraulic motor.

The disc tool replacement machine may comprise on the disc tool replacement level a replacement member to move the disc tools between the fastening/unfastening tool 420 and the storage area(s) 402 to 408. The replacement member may comprise at least one contacting member 416 to grip the disc tool and an actuator to move the contacting member 416 and the disc tool between the tool tip 420 and the storage area(s) 402 to 408. The actuator may comprise a linear actuator to provide linear motion, e.g. an up/down motion, and a rotary actuator, e.g. a servo motor, to provide a rotary motion. The linear motion may be needed to place the used discs to the spindles of the storage areas and to raise a new disc tool from the spindle. The linear motion may also be needed to position the disc tool to the tool tip 420. The rotary motion may be used to provide lateral motion to move the disc tools along the supporting plate 200 between the storage area 402 to 408 and the tool tip 420. Lateral linear motion may be combined with the lateral rotary motion in some embodiments.

The replacement member may comprise an arm 414 and at least one vacuum cup 416 provided along the arm 414. The vacuum cup(s) 416 may be used as the contacting member to grip the disc tools when the linear actuator presses the vacuum cup(s) into contact with the disc tool. The vacuum cup(s) may comprise an air duct between interior and exterior of the vacuum cups to remove the air from the interior of the vacuum cup 416 when the vacuum cup 416 grips the disc tool and to blow the air to the interior of the vacuum cup when the grip needs to be released.

Let us now describe the operation of the disc tool replacement with reference to FIG. 4. When the disc tool is placed on top of the through hole 204, the computer may initiate the disc tool replacement. The fastening/unfastening tool 422 is then raised such that the tool tip 420 is brought into contact with the fixing member 411 in the tool holder 104. The tool tip 420 is operated to release the fixing member, thus detaching the fixing member and the disc tool from the tool holder 104. Upon releasing the fixing member, the fastening/unfastening tool 422 is lowered such that the disc tool is separated from the tool holder to a sufficient distance. The sufficient distance may be defined as a distance necessary for the replacement member to be brought to grip the disc tool. Meanwhile, the disc tool is supported on the tool tip by the flange 418. After lowering the fastening/unfastening tool 422, the contacting member(s) 416 of the replacement member is brought into contact with the disc tool positioned on the tool tip, and the disc tool is gripped with the contacting member(s) 416. Upon gripping the disc tool, the replacement member is moved such that the disc tool is brought to a storage area storing the used disc tools. There, the grip is released, and the used disc tool is placed in the storage area. Thereafter, the replacement member is moved to another storage area storing unused disc tools, and the contacting member is controlled to grip a new disc tool comprised in this storage area. Upon gripping the new disc tool, the replacement member brings the new disc tool on top of the tool tip and the flange, and releases the new disc tool. Thereafter, the replacement member is moved away and the fastening/unfastening tool is raised to bring the new disc tool and the fixing member into contact with the tool holder 104. Then, the tool tip is again operated to attach the fixing member and the disc tool to the tool holder 104. After attaching the fixing member, the fastening/unfastening tool may be lowered into a resting position to wait for a new replacement.

After the new disc tool is attached to the tool holder 104, the tool holder may be moved along the guiding track 100 to the robot's working area to wait for the robot to change the tool holder.

Figure 5:
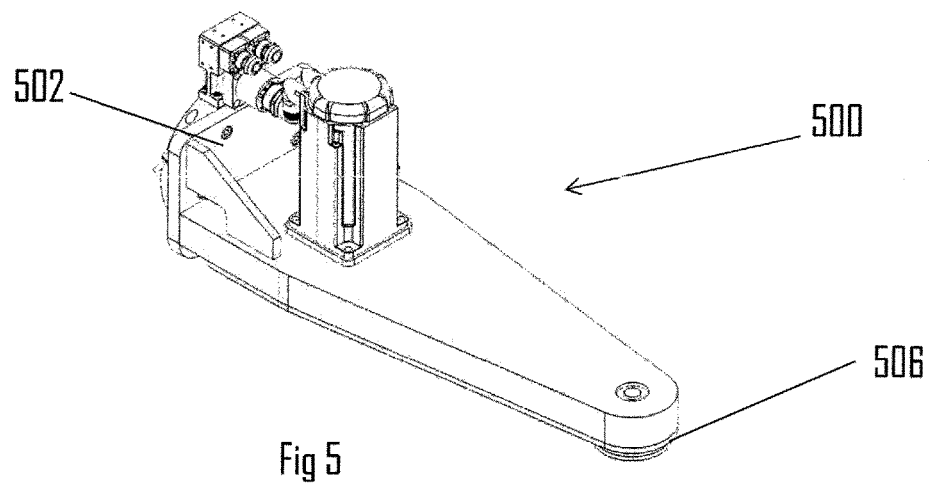
FIG. 5 illustrates an embodiment of a tool holder.

As mentioned above, the disc tool replacement is applicable to tool holders that may be detached from the robot's arm and to tool holders that are fixed to the robot's arm during the disc replacement. FIG. 5 illustrates an embodiment of a tool holder 500 that is fixed to the robot from one end 502, e.g. with bolts. This type of tool holder may be used in special surface finishing solutions, for example. The disc tool may be attached to the other end 506 of the tool holder. The tool holder 500 may comprise the backing plate at the end 506, although it is not shown in FIG. 5. The disc tool replacement procedure is similar: the tool holder is brought into the replacement area, the fixing member is detached from the tool holder, thus releasing the disc tool, the disc tool is changed, and the fixing member is attached back to the tool holder, thus also fixing the disc tool with the tool holder. The robot may bring the tool holder to the disc tool replacement machine for the replacement of the disc tool, and the gripper may grip the tool holder, e.g. from the end 506, and bring the tool holder (and the robot's arm) to the replacement area. Meanwhile, the disc tool replacement machine may control the motion, and the robot may let its arm follow the motion provided by the servo motor moving the gripper. When the disc tool has been changed, the gripper may release the grip from the tool holder, and the computer may signal to the robot that the disc tool replacement has been completed.

Figure 6:
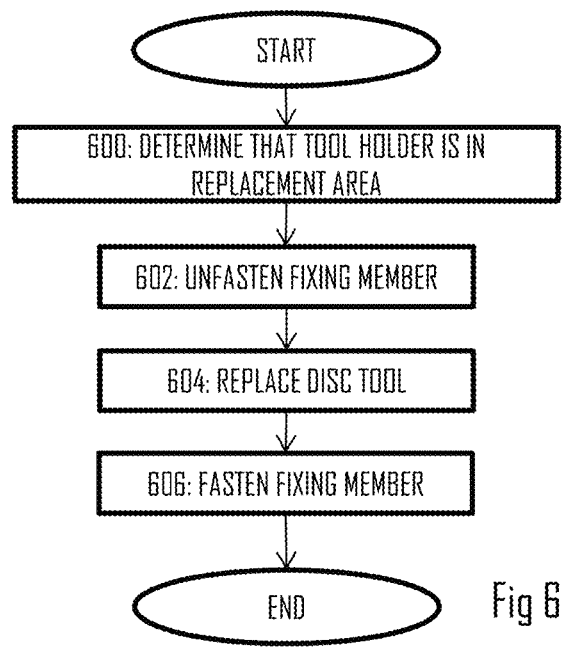
FIG. 6 is a flow diagram illustrating an automated process for replacing disc tools according to an embodiment of the invention.

The operation of the disc tool replacement machine may be understood as an automated process for replacing the disc tools. The process is controlled by the computer executing a computer program comprising program code instructions defining the control of the process. FIG. 6 illustrates a flow diagram of the automated disc tool replacement process. The steps of the process may be carried out by the disc tool replacement machine illustrated in FIG. 1, but it should be understood that the process may also encompass the operation of the computer controlling the process. The computer may be understood as an apparatus comprising at least one processor and at least one memory storing a computer program code. The computer program code may comprise program instructions defining the process.

Let us now describe, with reference to FIG. 6, the disc tool replacement process from the point of view of the whole disc tool replacement machine and from the point of view of the computer. Referring to FIG. 6, it is determined in block 600 that the tool holder is in a replacement area in the disc tool replacement machine. This may be determined by moving the gripper to the replacement area, reception of a signal from a sensor arranged to sense the tool holder in the replacement area, etc. In the embodiment of FIG. 1, the detection may be based on completing the motion of the servo motor moving the tool holders from the robot's working area to the replacement area.

In block 602, the fixing member of the tool holder is unfastened by applying an unfastening force to the fixing member. Upon detecting the tool holder in the replacement area, the computer may output one or more control signals to the fastening/unfastening tool to contact the fixing member and to apply the unfastening force. As described above, the fixing member fixes the disc tool to the backing plate of the tool holder through the through hole at the centre of the disc tool. In block 604, the disc tool is removed from the tool holder after said unfastening. This may be realized by separating the fastening/unfastening tool from the tool holder and gripping and removing the disc tool from the top of the fastening/unfastening tool. It should, however, be appreciated that in other embodiments the disc tool may be gripped while it is in contact with the backing plate. An essential feature is that the disc tool is removed automatically and replaced with a new one. The computer may control the removal of the used disc tool by outputting a control signal to the fastening/unfastening tool to separate from the tool holder, and by outputting a control signal to the replacement member to remove the used disc tool after the fastening/unfastening tool is separated from the tool holder. A new disc tool is placed to the backing plate in block 604. This may be realized by placing the new disc tool on top of the tool tip of the fastening/unfastening tool and moving the tool tip to face the tool holder. With respect to the computer, upon placing the new disc tool to an appropriate location and bringing the fixing member into contact with the tool holder, the computer may control the fastening/unfastening tool to apply a fastening force to the tool tip, thus fixing the fixing member to the tool holder and the disc tool to the backing plate (block 606).

An advantage of the automated process is that reloading new disc tools and removing the used ones may be carried out without interfering the robot's work process. Additionally, the number of required tool holders is low, and the operator's workload is reduced with respect to solutions where the operator manually changes the disc tools.

In the embodiment where the fixing member is a centre nut locking member 411, said unfastening the fixing member may comprise unscrewing the fixing member off from the tool holder, and the fastening may comprise screwing the fixing member to the tool holder. The fastening and unfastening forces are thus provided by rotary motion of the fastening/unfastening tool. In an embodiment, the tool tip of the fastening/unfastening tool is provided with a translational motion to bring the tool tip into contact with and to detach the tool tip from the counterpart of the fixing member.

Figure 8:
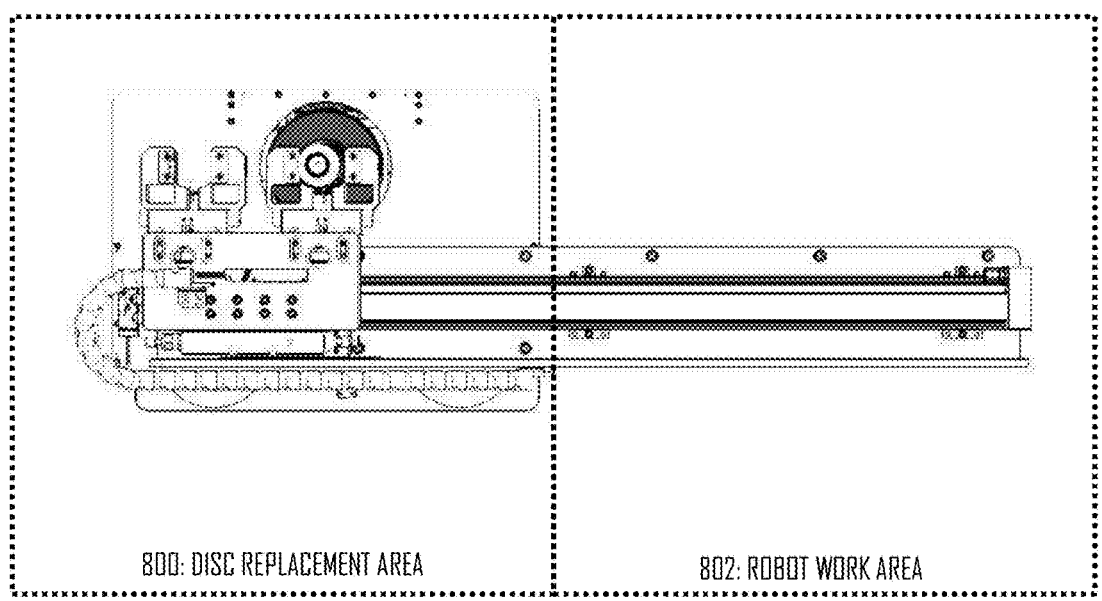
FIG. 8 illustrates areas of the disc tool replacement machine.

In an embodiment, at least one gripper is arranged to move between the replacement area and a second area a determined distance away from the replacement area, e.g. the robot's working area, to grip the tool holder in the second area, deliver the tool holder to the replacement area for the replacement of the disc tool, deliver tool holder back to the second area, and release the grip from the tool holder in the second area. FIG. 8 illustrates the disc tool replacement machine from above where the guiding track enables the delivery of the tool holders between the disc replacement area 800 and the robot's work area 802. The disc replacement area may comprise at least the location where the tool holder is brought for the replacement of the disc tool. The robot's work area may be surrounded by a protective perimeter structure, e.g. transparent walls or a cage. A hole may be provided in the perimeter structure. As described above, the guiding track may be provided in an elongated arm such that one end of the arm 801 (the part illustrated as the robot's work area 802 in FIG. 8) may be placed into the robot's work area through the hole. Accordingly, an operator may access the storage areas safely while the robot is working and add new disc tools to the storage areas storing the new disc tools and remove used disc tools from the storage areas storing the used disc tools.

In an embodiment, the gripper is arranged to grip the tool holder such that the grip prevents rotation of the disc tool when fastening and unfastening the fixing member. Let us bear in mind that the tool holder is also arranged to deliver a rotary force from the robot's motor to the disc tool such that the disc tool rotates to affect the grinding, cutting, or polishing. Thus, the tool holder may comprise a first part that rotates while the backing plate remains still and a second part that is fixed with respect to the backing plate. Gripping the tool holder from the first part may cause the rotation of the backing plate and the tool holder when attempting to unfasten the fixing member. The tool holder may thus grip the tool holder from the second part called a gripping part which is fixed with respect to the backing plate and the disc tool. A surface of the gripping part and a gripping surface of the gripper(s) may be formed as counterparts such that the gripper locks to the gripping part. In an embodiment, recessions are provided in the gripping part and matching protrusions are provided in the gripping surface of the gripper. When the protrusions enter the recessions, the gripper locks its grip to the gripping part, thus preventing the rotation of the backing plate during the fastening and unfastening of the fixing member. Naturally, other means for locking the grip may be provided.

Figure 7:
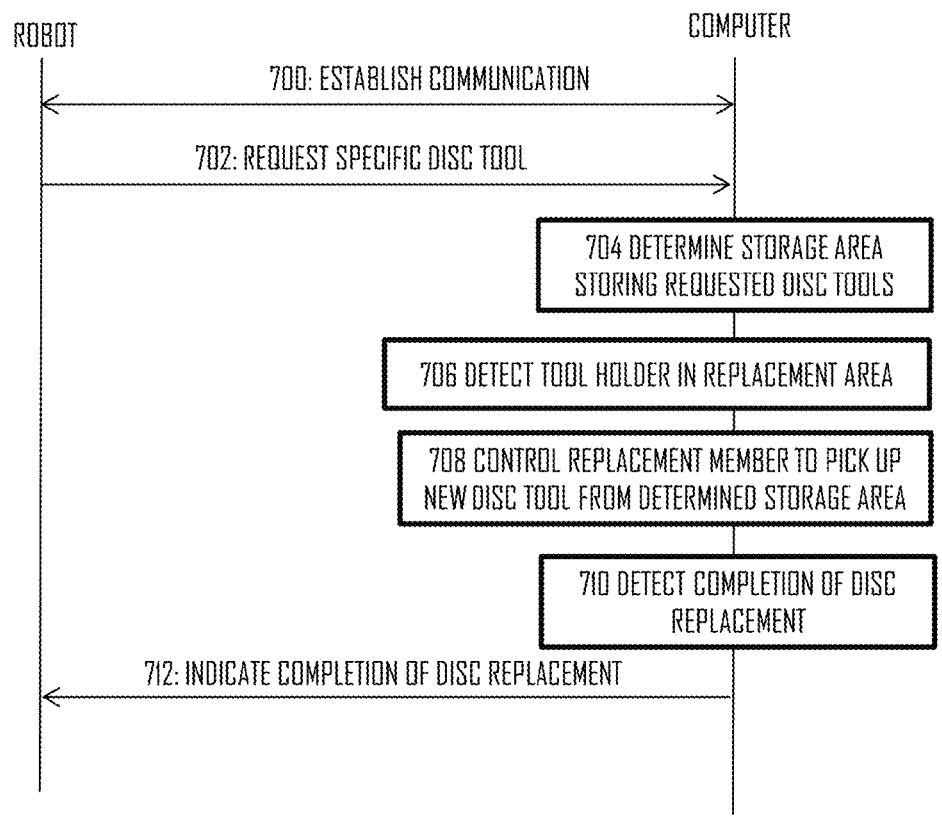
FIG. 7 is a flow diagram illustrating disc tool replacement when the disc tool replacement machine replaces several types of disc tools according to an embodiment of the invention.

FIG. 7 illustrates an embodiment for replacing the disc tool when the disc tool replacement machine comprises at least two storage areas for unused disc tools, wherein the at least two storage areas are associated with different types of disc tools. Additionally, at least one storage area may be provided for used disc tools. A communication link is provided between the computer and the robot, and the robot may request the computer to change a specific disc tool to the tool holder. Referring to FIG. 7, a communication link is established between the computer and the robot in step 700. While doing its work, the robot may choose to change the type of disc tool it uses. For example, it may first use a coarse-surfaced grinding disc and choose to change to a finer grinding disc. As a result, the robot communicates in step 702 to the computer a request for the specified disc tool to be changed. Upon receiving the request, the computer may change the next disc tool replacement process such that the new disc tool will be picked from a storage area storing the disc tools specified in the received request. In the embodiment of FIG. 7, the computer determines the storage area storing the requested disc tools in block 704. Upon detecting a start of the next disc tool replacement in block 706, the computer controls the replacement in the same manner as described above, but it controls the replacement member to pick up the new disc tool from the storage area determined in block 704 (block 708). The new type of disc tool is then attached to the tool holder. Upon detecting completion of the disc replacement (block 710), e.g. upon moving the tool holder to the robot's work area, the computer may output a signal to the robot in step 712, indicating completion of the requested change of the tool type. In an embodiment, the computer may also indicate in which tool holder or gripper the requested new type of disc tool is. Upon receiving the notification in step 712, the robot may pick up the tool holder having the new type of disc tool at its convenience.

The processes or methods described in FIGS. 6 and 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

According to an aspect, the disc tool replacement machine is provided. The disc tool replacement machine may comprise the computer configured to determine that the tool holder is in the replacement area in the disc tool replacement machine and to control the disc tool replacement. The disc tool replacement machine further comprises the fastening/unfastening tool configured to unfasten the fixing member of the tool holder by applying the unfastening force to the fixing member. The disc tool replacement machine further comprises a replacement member configured to remove the disc tool after said unfastening and to inserting a new disc tool to be attached to the tool holder. The fastening/unfastening tool then fastens the fixing member of the tool holder by applying the fastening force to the fixing member, thus fixing the disc tool to the backing plate of the tool holder through the through hole.

While this description provides a detailed description of some of the embodiments of the invention, all words and expressions should be interpreted broadly and they are intended to illustrate, not to restrict, the described embodiments. It will be obvious to a person skilled in the art that, as technology advances, the inventive concept can be implemented in various ways. The invention and its embodiments are not limited to the examples described above but may vary within the scope of the claims.

What is claimed is:

1. A disc tool replacement machine comprising:
   a controller configured to determine that a tool holder of an automated machine is in a replacement area associated with the disc tool replacement machine, the automated machine working with disc tools;
   a fastening tool configured to unfasten a fixing member of the tool holder by providing an unfastening force to the fixing member, wherein the fixing member fixes a first disc tool to a backing plate of the tool holder using a through hole at a centre of the first disc tool;
   a replacement system configured to remove the first disc tool from the tool holder after said unfastening and to provide a new disc tool to the tool holder,
   wherein the fastening tool is further configured to fasten, after the new disc tool has been provided to the tool holder, the fixing member of the tool holder by applying a fastening force to the fixing member, thus fixing the new disc tool to the backing plate of the tool holder through a new through hole associated with the new disc tool;
   at least one gripper, the at least one gripper having a lower end that is proximal to the fastening tool and having an upper end that is distal to the fastening tool, the at least one gripper configured to grip the tool holder and to position the tool holder in the replacement area such that the first disc tool, that is fixed to the tool holder, is located at the lower end of the at least one gripper, proximate the fastening tool, wherein the first disc tool detaches from the tool holder and remains on top of the fastening tool after said unfastening, wherein the replacement system is configured to grip the first disc tool and remove the first disc tool from the fastening tool, and is configured to provide the new disc tool on top of the fastening tool, and wherein the fastening tool is configured to rise towards the tool holder to bring the new disc tool into contact with the backing plate; and
   a first storage area configured to store used disc tools and a second storage area configured to store unused disc tools, wherein the replacement system is configured to grip the first disc tool with a replacement member when removing the first disc tool from the top of the fastening tool and move the first disc tool to the first storage area, the replacement system being configured to grip the new disc tool from the second storage area when removing the new disc tool from the second storage area and place the new disc tool on top of the fastening tool before fastening the new disc tool to the tool holder.

2. A method comprising:
   providing the disc tool replacement machine according to claim 1;
   determining that the tool holder of the automated machine working with disc tools is in the replacement area;
   unfastening the fixing member of the tool holder by applying an unfastening force to the fixing member, wherein the fixing member fixes the first disc tool to the backing plate of the tool holder using the through hole at the centre of the first disc tool;
   removing the first disc tool from the tool holder after said unfastening;
   providing a new disc tool to the tool holder; and
   fastening the fixing member of the tool holder by applying a fastening force to the fixing member, thus fixing the new disc tool to the backing plate of the tool holder through the new through hole.

3. The method of claim 2, wherein the fixing member is a centre nut locking member, wherein unfastening the fixing member comprises unscrewing the fixing member off from the tool holder, and wherein fastening comprises screwing the fixing member to the tool holder.

4. The method of claim 3, wherein the fastening and the unfastening are performed by the fastening tool, which fastening tool comprises a screwing tool comprising a tool tip that matches with a counterpart of the fixing member, and wherein the fastening and unfastening are performed by providing the tool tip with a translational motion to bring the tool tip into contact with and to detach the tool tip from the counterpart of the fixing member and by providing the tool tip with a rotational motion to screw and unscrew the fixing member.

5. The method of claim 2, wherein the tool holder is positioned in the replacement area proximate the fastening tool that unfastens the fixing member, wherein the first disc tool detaches from the tool holder and remains on top of the fastening tool after said unfastening, the method further comprising:

gripping the first disc tool and removing the first disc tool from the fastening tool;

providing the new disc tool on top of the fastening tool; and raising the fastening tool towards the tool holder to bring the new disc tool into contact with the backing plate.

6. The method of claim 5, wherein a flange is provided at a head of the fastening tool to support one of the first disc tool and the new disc tool.

7. The method of claim 5, wherein the first storage area stores used disc tools and the second storage area stores unused disc tools, the method further comprising:

gripping the first disc tool with the replacement member when removing the first disc tool from the top of the fastening tool and moving the first disc tool to the first storage area;

gripping the new disc tool from the second storage area when removing the new disc tool from the second storage area, and placing the new disc tool on top of the fastening tool before fastening the new disc tool to the tool holder.

8. The method of claim 7, wherein the replacement member comprises an arm and at least one vacuum cup at an end of the arm, wherein the arm is arranged to be movable under an automated guidance and wherein said at least one vacuum cup is arranged to grip one of the disc tools.

9. The method of claim 2, wherein the at least one gripper is arranged to move between the replacement area and a second area a determined distance away from the replacement area, to grip the tool holder in the second area, deliver the tool holder to the replacement area for the replacement of the first disc tool with the new disc tool, deliver the tool holder back to the second area, and release the grip from the tool holder in the second area.

10. The method of claim 9, wherein the at least one gripper is arranged to grip the tool holder such that the grip prevents rotation, when fastening and unfastening the fixing member, of the one of the first disc tool and the new disc tool that is fixed to the tool holder.

11. The method of claim 2, wherein the disc tool replacement machine comprises at least one further storage area for unused disc tools, the method further comprising:

providing a communication link with the automated machine;

associating each storage area storing the unused disc tools with a different type of disc tool;

receiving from the automated machine a request to change the disc tool type and information specifying a new disc tool type;

selecting an unused disc tool from at least one of the storage areas storing unused disc tools matching with the new disc tool type requested by the automated machine; and causing provision of the selected disc tool to the tool holder.

12. The method of claim 2, wherein the tool holder is detachably attachable to the automated machine, and wherein the tool holder is detached from the automated machine during the replacement of the first disc tool.

13. The method of claim 2, wherein the tool holder is fixed to an arm of the automated machine during the replacement of the first disc tool.

14. The disc tool replacement machine of claim 1, wherein the fixing member is a centre nut locking member, wherein the fastening tool is configured to unfasten the fixing member by unscrewing the fixing member off from the tool holder and to fasten the fixing member by screwing the fixing member to the tool holder.

15. The disc tool replacement machine of claim 14, wherein the fastening tool comprises a screwing tool comprising a tool tip that matches with a counterpart of the fixing member, the fastening tool being configured to provide the tool tip with a translational motion to bring the tool tip into contact with and to detach the tool tip from the counterpart of the fixing member, the fastening tool being configured to provide a rotational motion to screw and unscrew the fixing member.

16. The disc tool replacement machine of claim 1, wherein a flange is provided at a head of the fastening tool to support one of the first disc tool and the new disc tool.

17. The disc tool replacement machine of claim 1, wherein the replacement member comprises an arm and at least one vacuum cup at an end of the arm, wherein the arm is configured to be movable under an automated guidance provided by the controller, and wherein said at least one vacuum cup is arranged to grip one of the first disc tool and the new disc tool.

18. The disc tool replacement machine of claim 1, wherein the at least one gripper is configured to move between the replacement area and a second area a determined distance away from the replacement area, to grip the tool holder in the second area, deliver the tool holder to the replacement area for the replacement of the first disc tool with the new disc tool, deliver the tool holder back to the second area, and release the grip from the tool holder in the second area.

19. The disc tool replacement machine of claim 18, wherein the at least one gripper is configured to grip the tool holder such that gripping the tool holder prevents rotation, when fastening and unfastening the fixing member, of the one of the first disc tool and the new disc tool that is fixed to the tool holder.

20. The disc tool replacement machine of claim 1, wherein the disc tool replacement machine comprises at least one further storage area for unused disc tools and a communication interface able to communicate with the automated machine, and wherein the controller is configured to associate each storage area storing the unused disc tools with a different type of disc tool, to receive from the automated machine through the communication interface a request to change the disc tool type and information specifying a new disc tool type, to select an unused disc tool from at least one of the storage areas storing unused disc tools matching with the new disc tool type requested by the automated machine, and to cause provision of the selected disc tool to the tool holder.

21. The disc tool replacement machine of claim 1, wherein the tool holder is detachably attachable to the automated machine, and wherein the tool holder is configured to be detached from the automated machine during the replacement of the first disc tool.

22. The disc tool replacement machine of claim 1, further configured to replace the first disc tool with the new disc tool when the tool holder is fixed to an arm of the automated machine.

* * * * *